US009781346B2

(12) United States Patent
Abe

(10) Patent No.: US 9,781,346 B2
(45) Date of Patent: Oct. 3, 2017

(54) IMAGE CAPTURING CONTROL APPARATUS, IMAGE CAPTURING APPARATUS AND STORAGE MEDIUM STORING IMAGE CAPTURING CONTROL PROGRAM FOR DRIVING A MOVABLE ELEMENT WHEN MOTION VECTORS HAVE MUTUALLY DIFFERENT MAGNITUDES

(71) Applicant: CANON KABUSHIKI KAISHA, Tokyo (JP)

(72) Inventor: Tomonari Abe, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/175,924

(22) Filed: Jun. 7, 2016

(65) Prior Publication Data

US 2016/0360114 A1   Dec. 8, 2016

(30) Foreign Application Priority Data

Jun. 8, 2015 (JP) ................................. 2015-115382

(51) Int. Cl.
*H04N 5/232* (2006.01)
*G06T 7/246* (2017.01)
*G06K 9/46* (2006.01)
*H04N 5/225* (2006.01)

(52) U.S. Cl.
CPC ....... *H04N 5/23287* (2013.01); *G06K 9/4642* (2013.01); *G06T 7/246* (2017.01); *H04N 5/23209* (2013.01); *H04N 5/23254* (2013.01); *G06T 2207/10004* (2013.01);

(Continued)

(58) Field of Classification Search
CPC .......... H04N 5/23287; H04N 5/23209; H04N 5/23254; G06T 7/246; G06K 9/4642
See application file for complete search history.

(56) References Cited

U.S. PATENT DOCUMENTS

| 8,988,536 B2* | 3/2015 | Park .................... H04N 5/145 348/208.6 |
| 9,294,675 B2* | 3/2016 | Tsubaki ............... H04N 5/144 |
| 9,332,185 B2* | 5/2016 | Ho ..................... H04N 5/23267 |

(Continued)

FOREIGN PATENT DOCUMENTS

JP     2006-317848 A    11/2006

*Primary Examiner* — Nicholas Giles
(74) *Attorney, Agent, or Firm* — Cowan, Liebowitz & Latman, P.C.

(57) ABSTRACT

The image capturing control apparatus to control an image capturing apparatus that performs still image capturing of a moving object with drive of a movable element movable in a direction other than an optical axis direction of an image capturing optical system. The control apparatus includes a vector acquisition unit to acquire multiple motion vectors respectively detected in multiple object areas of a captured moving image produced by the image capturing apparatus, and a control unit to control the still image capturing with a drive control of the movable element. The control unit causes the image capturing apparatus, when the multiple motion vectors have mutually different magnitudes, to perform the still image capturing multiple times with the drive controls of the movable element while changing a drive amount of the movable element on the basis of the respective multiple motion vectors.

9 Claims, 11 Drawing Sheets

(52) U.S. Cl.
CPC ............ *G06T 2207/10144* (2013.01); *G06T 2207/10148* (2013.01); *H04N 5/2254* (2013.01)

(56) References Cited

U.S. PATENT DOCUMENTS

| | | | |
|---|---|---|---|
| 2012/0162454 A1* | 6/2012 | Park | H04N 5/145 348/208.6 |
| 2015/0138380 A1* | 5/2015 | Tsubaki | H04N 5/144 348/208.1 |
| 2015/0189182 A1* | 7/2015 | Ho | H04N 5/23267 348/208.6 |
| 2016/0301858 A1* | 10/2016 | Aoyama | H04N 5/23222 |

\* cited by examiner

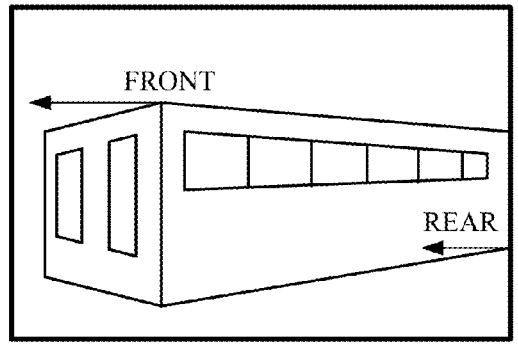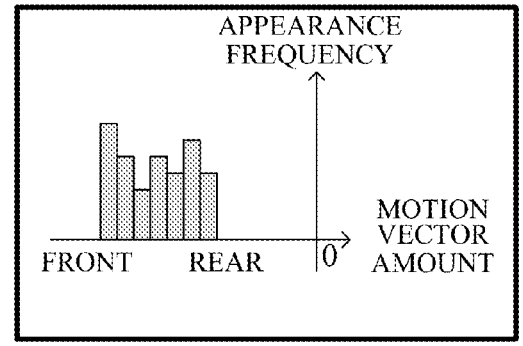
FIG. 9A  FIG. 9B
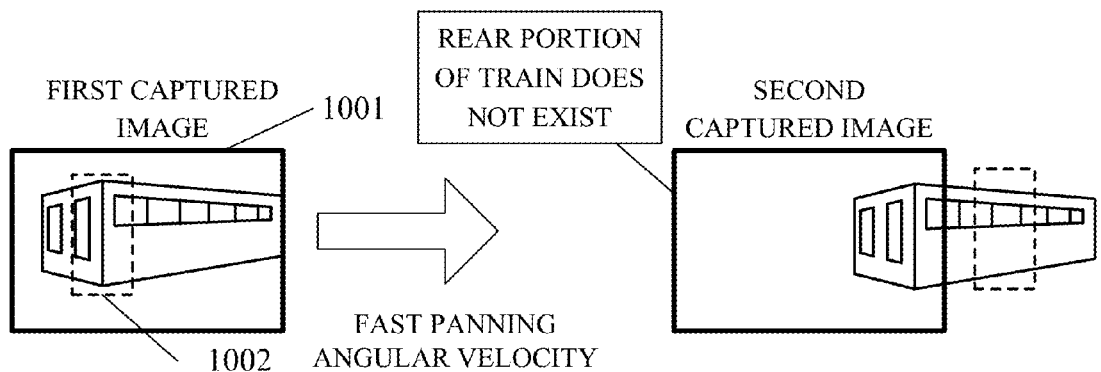
FIG. 10A
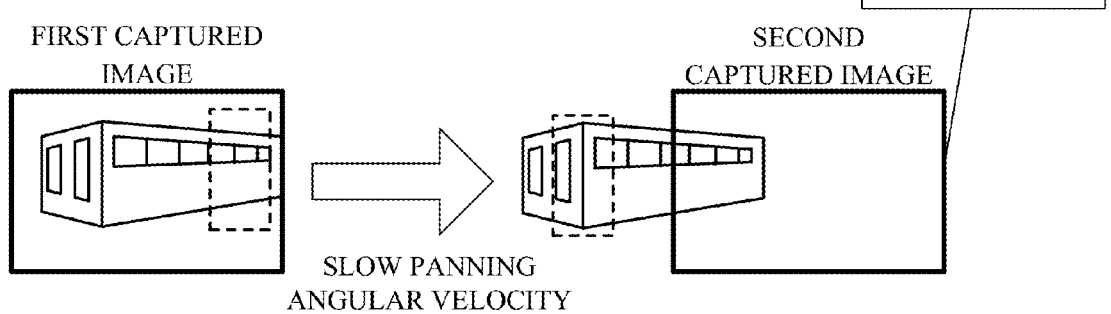
FIG. 10B

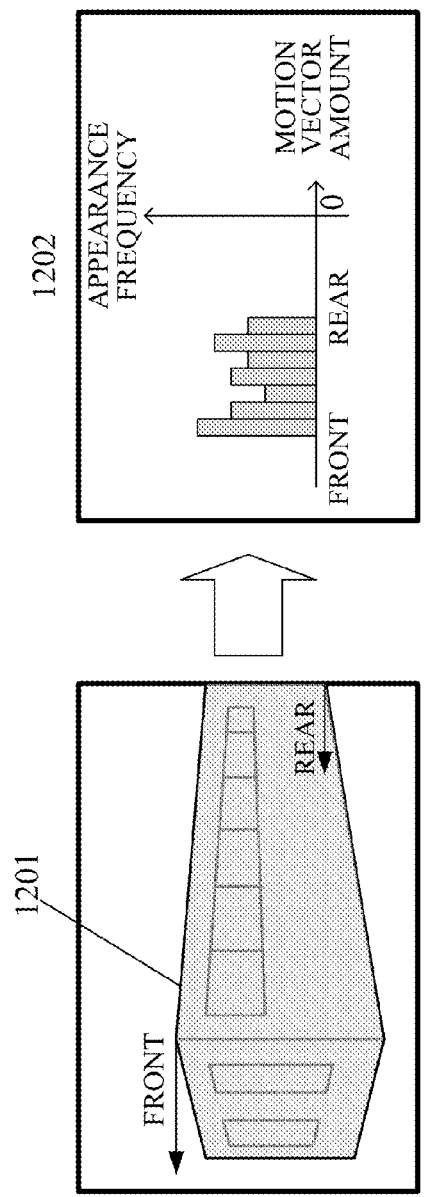
FIG. 12A
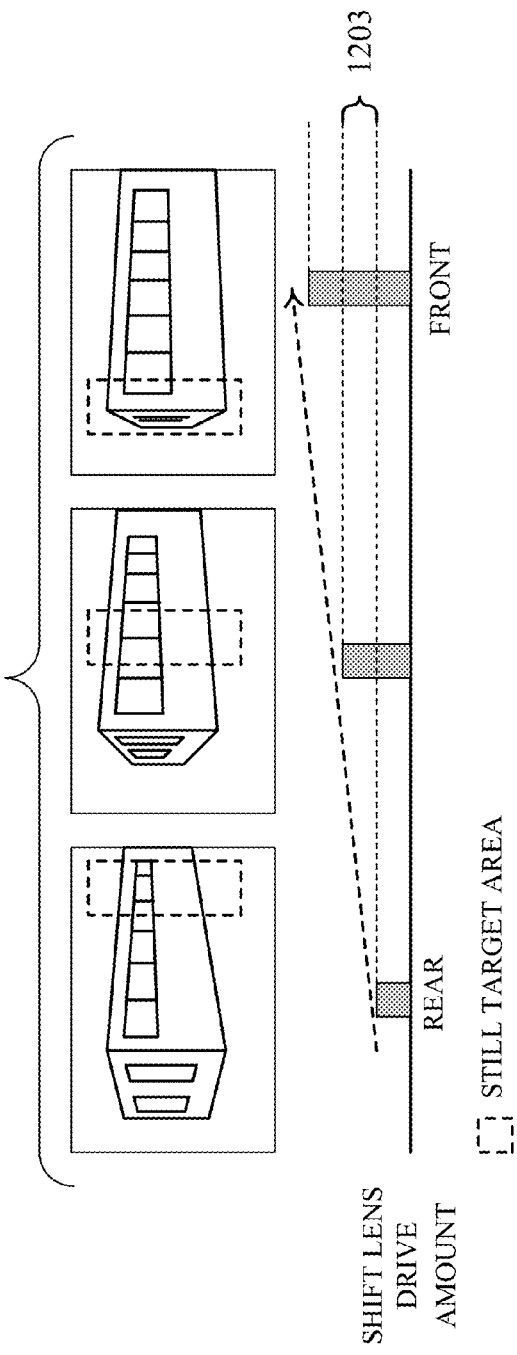
FIG. 12B
FIG. 12C

IMAGE CAPTURING CONTROL
APPARATUS, IMAGE CAPTURING
APPARATUS AND STORAGE MEDIUM
STORING IMAGE CAPTURING CONTROL
PROGRAM FOR DRIVING A MOVABLE
ELEMENT WHEN MOTION VECTORS HAVE
MUTUALLY DIFFERENT MAGNITUDES

BACKGROUND OF THE INVENTION

Field of the Invention

The present invention relates to an image capturing control apparatus to assist follow shot performed by a user.

Description of the Related Art

Follow shot is an image capturing technique for expressing a sense of speed of a moving object. In the follow shot, a photographer (user) causes an image capturing apparatus to perform still image capturing while panning the image capturing apparatus so as to follow a movement of a main object that is a user's image capturing target and thereby can obtain a still image including a still main object and a flowing (blurred) background. However, a difference of a user's panning speed of the image capturing apparatus from a moving speed of the main object results in a still image including a blurred main object.

Japanese Patent Laid-Open No. 2006-317848 discloses a method that, in order to provide an assist (follow shot assist) to a user performing follow shot, moves (shifts) a shift lens with respect to an optical axis to absorb a difference between a panning speed of an image capturing apparatus and a moving speed of a main object. Specifically, the method calculates, on a basis of the panning speed of the image capturing apparatus detected by a gyro sensor and a motion vector detected in a captured moving image (between consecutive frame images), a shift drive amount of the shift lens for capturing the main object at a center of a captured image and drives the shift lens by the calculated shift amount, which enables good follow shot.

However, detection of motion vectors having mutually different magnitudes in multiple areas of the captured moving image may cause a follow shot assist targeting an object different from the main object as the user's image capturing target.

For example, in image capturing of a long object such as a train, motion vectors detected at a front portion and a rear portion of the object are different from each other. In this case, even though the user's main object is the rear portion of the object, the motion vector may be detected at the front portion of the object and thereby a still image including a blurred main object may be provided.

SUMMARY OF THE INVENTION

The present invention provides an image capturing control apparatus capable of performing a follow shot assist targeting a main object as a user's image capturing target even when motion vectors having mutually different magnitudes are detected in multiple areas of a captured moving image. The present invention further provides an image capturing apparatus provided with the image capturing control apparatus.

The present invention provides as an aspect thereof an image capturing control apparatus configured to control an image capturing apparatus that performs still image capturing of a moving object with drive of a movable element movable in a direction other than an optical axis direction of an image capturing optical system. The image capturing control apparatus includes a vector acquisition unit configured to acquire multiple motion vectors respectively detected in multiple object areas of a captured moving image produced by the image capturing apparatus, and a control unit configured to control the still image capturing with a drive control of the movable element. The control unit is configured to cause the image capturing apparatus, when the multiple motion vectors have mutually different magnitudes, to perform the still image capturing multiple times with the drive controls of the movable element while changing a drive amount of the movable element on the basis of the respective multiple motion vectors.

The present invention provides as another aspect thereof an image capturing apparatus including the above image capturing control apparatus.

The present invention provides as still another aspect thereof non-transitory computer readable medium storing a program causing a computer to control an image capturing apparatus that performs still image capturing of a moving object with drive of a movable element movable in a direction other than an optical axis direction of an image capturing optical system. The program causes the computer to acquire multiple motion vectors respectively detected in multiple object areas of a captured moving image produced by the image capturing apparatus, and to perform a control process to control the still image capturing with a drive control of the movable element. The control process causes the image capturing apparatus, when the multiple motion vectors have mutually different magnitudes, to perform the still image capturing multiple times with the drive controls of the movable element while changing a drive amount of the movable element on the basis of the respective multiple motion vectors.

Further features and aspects of the present invention will become apparent from the following description of exemplary embodiments with reference to the attached drawings.

BRIEF DESCRIPTION OF THE DRAWINGS

FIGS. 9A and 9B illustrate an object moving closer to an image capturing apparatus.

FIGS. 10A and 10b illustrate examples of captured images obtained by the follow shot assist continuous image capturing process.

FIGS. 12A to 12C illustrate captured images obtained by continuous image capturing performed with the correction vector being changed.

DESCRIPTION OF THE EMBODIMENTS

Exemplary embodiments of the present invention will hereinafter be described with reference to the accompanying drawings.

Embodiment 1

Figure 1:
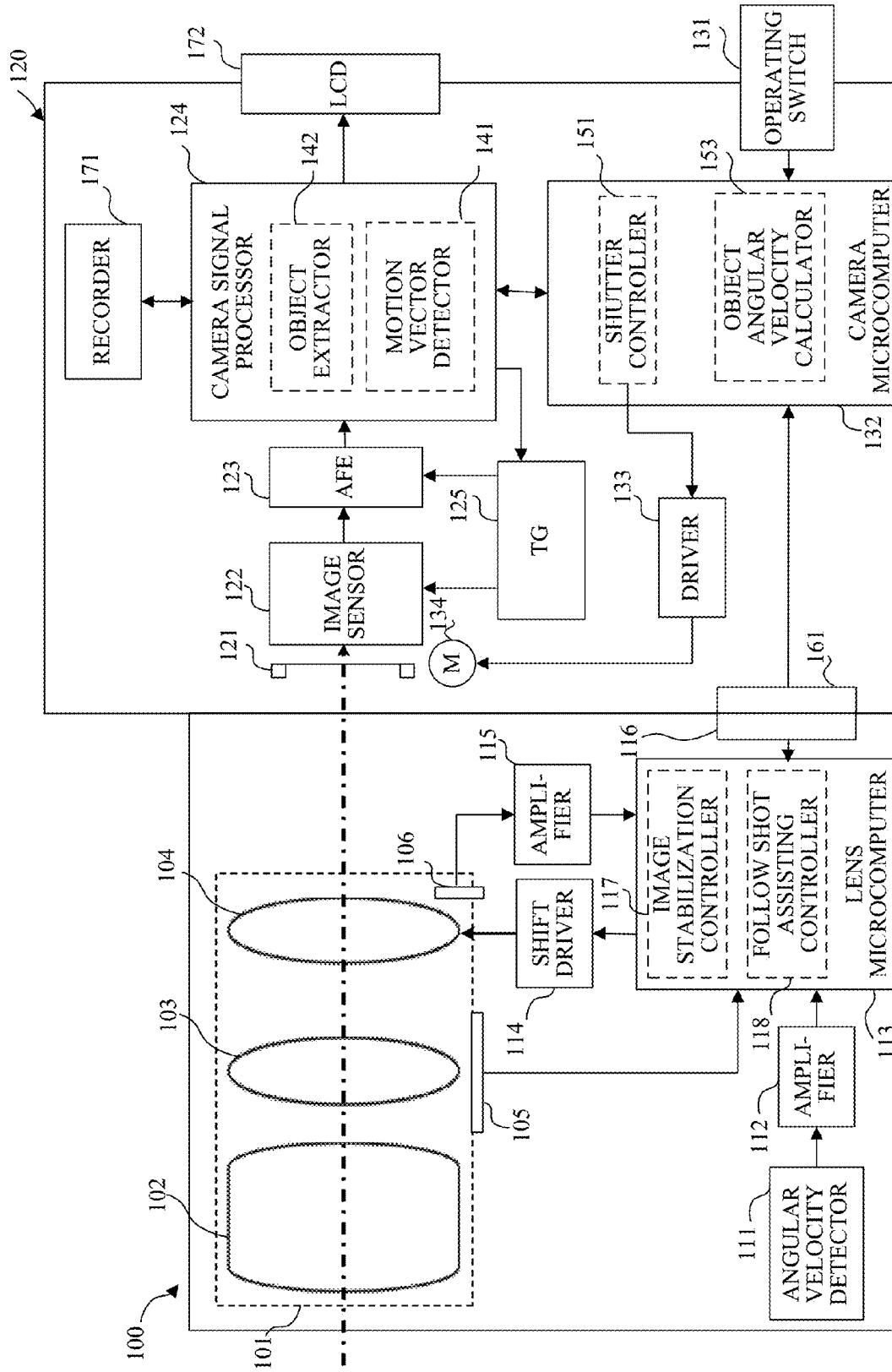
FIG. 1 is a block diagram illustrating a configuration of an image capturing apparatus that is Embodiment 1 of the present invention.

FIG. 1 illustrates a configuration of a camera system constituted by a lens-interchangeable image capturing apparatus (hereinafter referred to as "a camera body") 120 provided with an image capturing control apparatus that is a first embodiment (Embodiment 1) of the present invention and an interchangeable lens 100 attached to the camera body 120. The camera system is hereinafter also simply referred to as "a camera".

The interchangeable lens 100 has a lens mount that is mechanically and detachably coupled with a camera mount of the camera body 120. The lens mount is provided with a mount contact portion 116 for communicating with the camera body 120 and receiving power supply from the camera body 120.

The interchangeable lens 100 has an image capturing optical system 101. The image capturing optical system 101 includes a main optical system 102 and a magnification-varying lens unit 103 that is moved in an optical axis direction in which an optical axis of the image capturing optical system 101 extends to change a focal length of the image capturing optical system 101. The main optical system 102 includes a focus lens that is moved in the optical axis direction to perform focusing, an aperture stop that controls a light quantity and others.

The image capturing optical system 101 further includes a shift lens unit 104 as a movable element that is shiftable (movable) in a shift direction orthogonal to the optical axis (in other words, in a direction other than the optical axis direction). The shift lens unit 104 is shifted (moved) in the direction orthogonal to the optical axis so as to optically correct or reduce an image blur caused by camera shaking due to hand jiggling or the like and so as to perform a follow shot assist, which will be described later.

The interchangeable lens 100 includes a zoom encoder 105 configured to detect a position of the magnification-varying lens unit 103 and a shift position detector 106 configured to detect a position (shift position) of the shift lens unit 104 in the shift direction. The interchangeable lens 100 further includes an angular velocity sensor 111 as a motion detecting unit configured to detect an angular velocity of the camera shaking or panning of the camera and an amplifier 112 configured to amplify an output of the angular velocity sensor 111.

The interchangeable lens 100 further includes a lens microcomputer 113. The lens microcomputer 113 includes an image stabilization controller 117 configured to perform an image stabilization control to reduce the image blur and a follow shot assist controller 118 to perform a control for the follow shot assist. The image stabilization controller 117 and the follow shot assist controller 118 controls drive of the shift lens 104 via a shift driver 114. The amplifier 115 amplifies the output of the angular velocity sensor 111 and supplies the amplified output to the lens microcomputer 113.

The shift lens unit 104 is actually shifted in two shift directions, as the directions orthogonal to the optical axis, that are orthogonal to each other, such as a horizontal (yaw) direction and a vertical (pitch) direction, and therefore the angular velocity sensor 111, the amplifier 115, the shift driver 114, the shift position sensor 106 and the amplifier 112 are provided for each shift direction. Since the angular velocity sensors 111 and the shift drivers 114 for the respective shift directions have the same configurations, FIG. 1 illustrates the angular velocity sensor 111 and the shift driver 114 only in one shift direction.

The lens microcomputer 113 further controls drive of the focus lens and drive of the aperture stop.

The camera body 120 includes a shutter 121 and an image sensor 122 such as a CMOS sensor, an analog signal processor 123, a camera signal processor 124 and a timing generator (TG) 125. The shutter 121 controls an exposure amount of the image sensor 122. The image sensor 122 photoelectrically converts (captures) an object image formed by the image capturing optical system 101 to output an electric signal (analog image capturing signal).

The analog signal processor 123 amplifies the analog image capturing signal output from the image sensor 122 and converts the amplified analog image capturing signal into a digital image capturing signal. The camera signal processor 124 performs various image processes on the digital image capturing signal to produce a moving image signal (captured motion image such as a live-view image) and a still image signal (captured still image). The image sensor 122, the analog signal processor 123 and the camera signal processor 124 constitute an image capturing system.

The camera signal processor 124 includes an object extractor (object extracting unit) 142 and a motion vector detector (motion vector detecting unit) 141. The object extractor 142 extracts, from the moving image signal, an object area containing an object. The motion vector detector 141 detects a motion vector in the object area of the moving image signal.

The TG 125 is configured to set times at which the image sensor 122 and the analog signal processor 123 operate.

The camera body 120 further includes an operating switch 131 such as a power switch, a release switch (including an image capturing preparation switch and an image capturing start switch) and a mode setting switch for changing over whether or not to set a follow shot assist mode.

The camera body 120 further includes a camera microcomputer 132 configured to control operations of the entire camera (that is, of the camera body 120 and the interchangeable lens 100). The camera microcomputer 132 includes a shutter controller 151 configured to control, through a shutter driver 133, drive of a shutter motor 124 that causes the shutter 121 to perform a shutter operation. The camera microcomputer 132 further includes an object angular velocity calculator 153 configured to calculate an angular velocity of the object (object image) on an image plane. The image plane corresponds to an image pickup surface of the image sensor 122. The angular velocity of the object is hereinafter referred to as "an object angular velocity". The object angular velocity corresponds to a motion velocity of the object.

The camera body 120 further includes a display unit (display element) 172 such as a liquid crystal panel configured to display the captured moving image as a live-view image and the captured still image. The display unit 172 is hereinafter referred to as an "LCD". The captured still image is recorded by a recorder 117 to a recording medium such as a memory card. The camera body 120 has the above-mentioned camera mount provided with a mount contact portion 116 that is electrically connected to the mount contact portion 116 of the lens mount for communicating with the interchangeable lens 100 (lens microcomputer 113) and supplying power to the interchangeable lens 100.

In FIG. 1, when the power switch of the operating switch 131 is operated by a user and thereby the camera body 120 is powered on, the camera microcomputer 132 detecting that state change supplies power to each part in the camera body 120 and performs initial settings of the camera body 120. The camera microcomputer 132 supplies the power also to the interchangeable lens 100. The lens microcomputer 113 performs initial settings of the interchangeable lens 100. The camera microcomputer 132 and the lens microcomputer 113 start communication therebetween. The camera microcomputer 132 sends to the lens microcomputer 113 information on a state of the camera body 120 and information on image capturing settings, such as setting/non-setting of the follow shot assist mode. The lens microcomputer 113 sends to the camera microcomputer 132 information on the focal length of the image capturing optical system 101 and information on the angular velocity of the interchangeable lens 100 detected by the angular velocity sensor 111.

In a normal image capturing mode in which the follow shot assist mode is not set, the angular velocity of the camera shaking due to the hand jiggling is detected through the angular velocity sensor 111 in the interchangeable lens 100. The image stabilization controller 117 in the lens microcomputer 113 controls, on a basis of the detection result, the drive of the shift lens unit 104 so as to reduce the image blur. On the other hand, in the follow shot assist mode, the angular velocity of the panning of the camera is detected through the angular velocity sensor 111. The follow shot assist controller 118 in the lens microcomputer 113 controls, on a basis of the detection result, the drive of the shift lens unit 104 to perform the follow shot assist.

Figure 2:
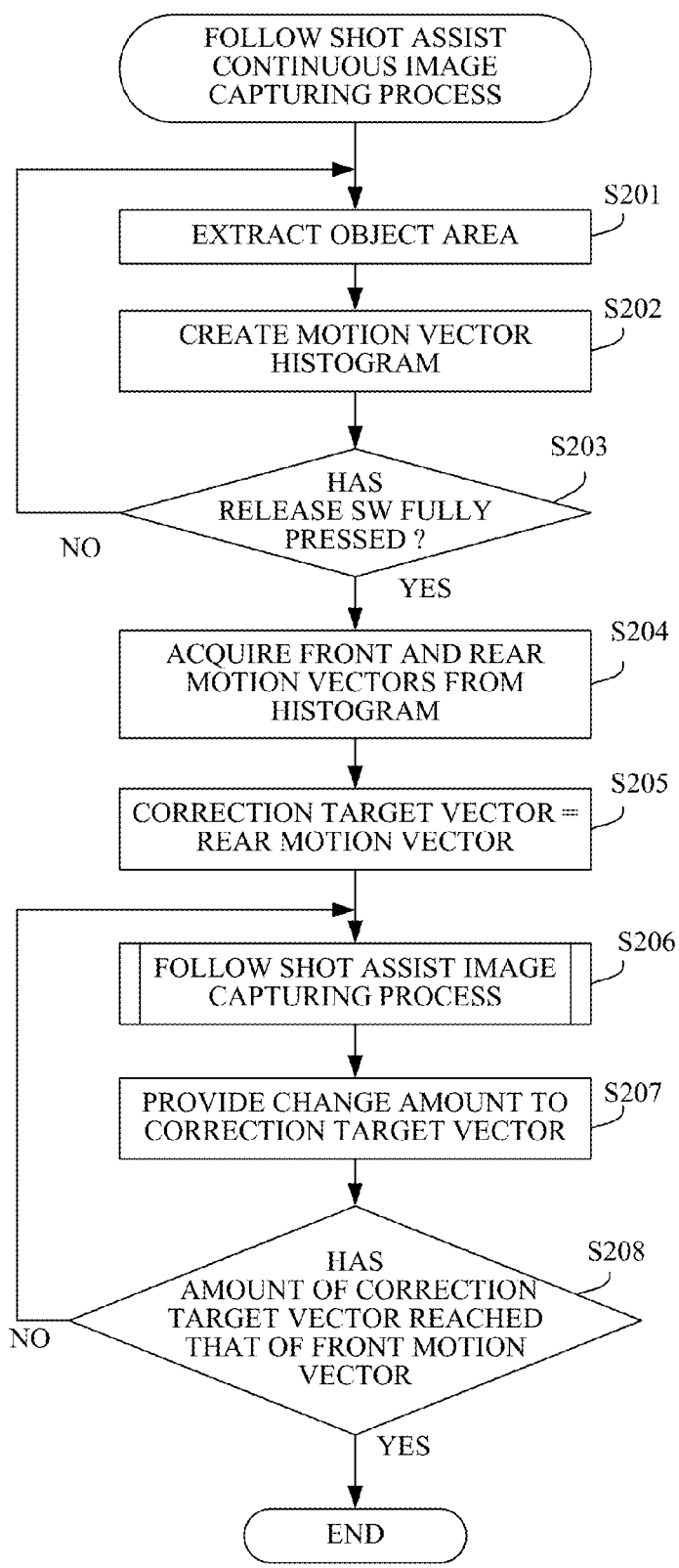
FIG. 2 is a flowchart illustrating a follow shot assist continuous image capturing process in Embodiment 1.

Next, description will be made of a continuous image capturing process in the follow shot assist mode (follow shot assist continuous image capturing process) with referring to FIG. 2. The camera microcomputer 132 serving as a motion vector acquisition unit and a control unit performs this process, together with the lens microcomputer 113, according to an image capturing control program as a computer program. In FIG. 2, reference character S represents a step. Description herein will be made of a case of performing follow shot assist continuous image capturing of an object moving closer to the camera.

At S201, in response to a user's half-press operation of the release switch in the operating switch 131, the camera microcomputer 132 performs an image capturing preparation operation (such as AF and AE) and causes the object extractor 142 in the camera signal processor 124 to extract an object area in a currently captured moving image. The object extractor 142 extracts the object area by using a variety of methods, such as a color or edge detection method and a specific object recognition method (such as a face recognition method).

Next, at S202, the camera microcomputer 132 causes the motion vector detector 141 in the camera signal processor 124 to detect a motion vector in the object area extracted at S201 to acquire the detected motion vector. The motion vector detector 141 detects the motion vector, by a known method such as a block matching method, in the object area between consecutive frame images constituting the captured moving image.

Figure 4A:
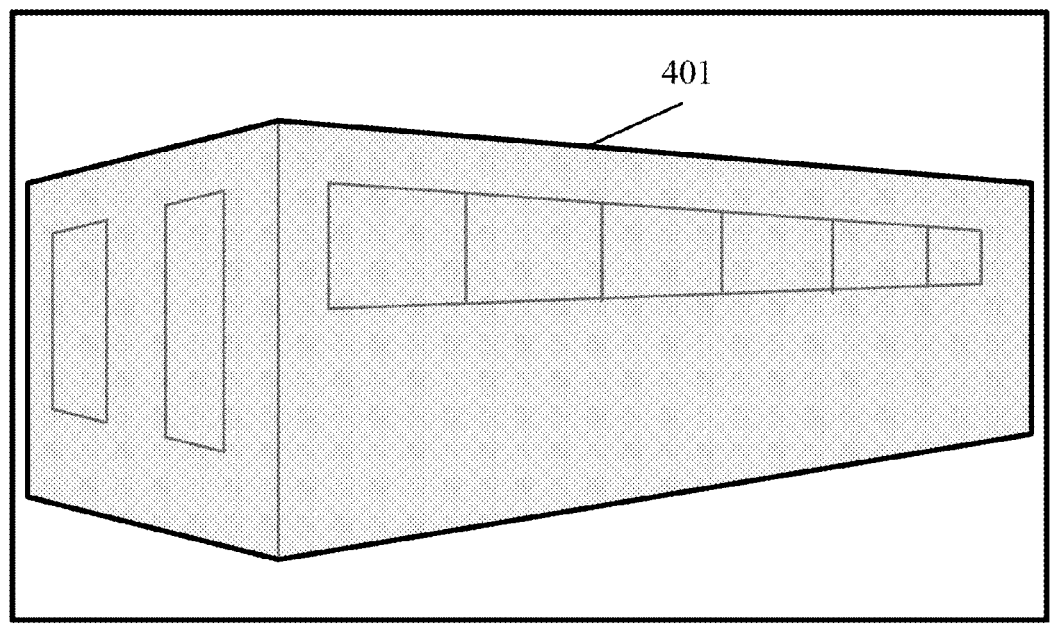
FIGS. 4A and 4B illustrate a method of creating a motion vector histogram in Embodiment 1.
Figure 4B:
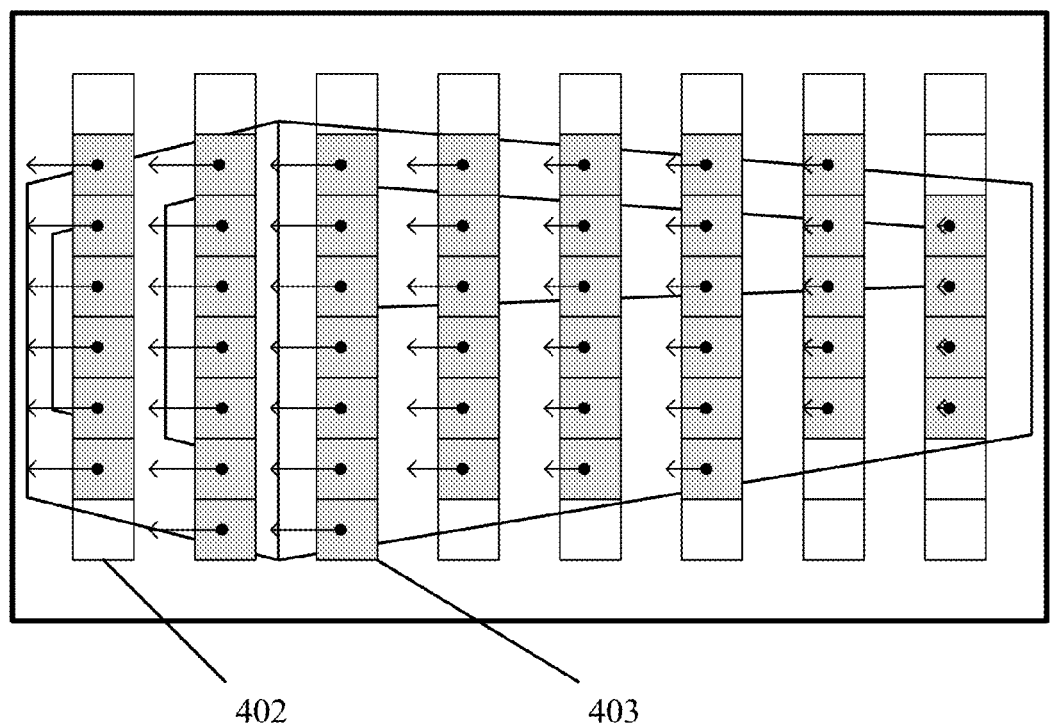

FIG. 4A illustrates an object area 401 (including a moving train) extracted from the captured moving image at S201. FIG. 4B illustrates multiple reference blocks 402 arranged over the entire area of the captured moving image. Each of the reference blocks 402 is a unit area where the motion vector is detected. This embodiment arranges 64 (=8×8) reference blocks 402. Arrows in FIG. 4B denotes motion vectors 403 detected in the respective reference blocks 402 in the object area 401.

The camera microcomputer 132 further creates at S202 a histogram indicating magnitudes and appearance frequencies of the motion vectors in the multiple reference blocks 402 acquired from the motion vector detector 141. Description will be made of a method of creating the histogram of the motion vectors with referring to FIGS. 4A, 4B and 5.

Figure 5:
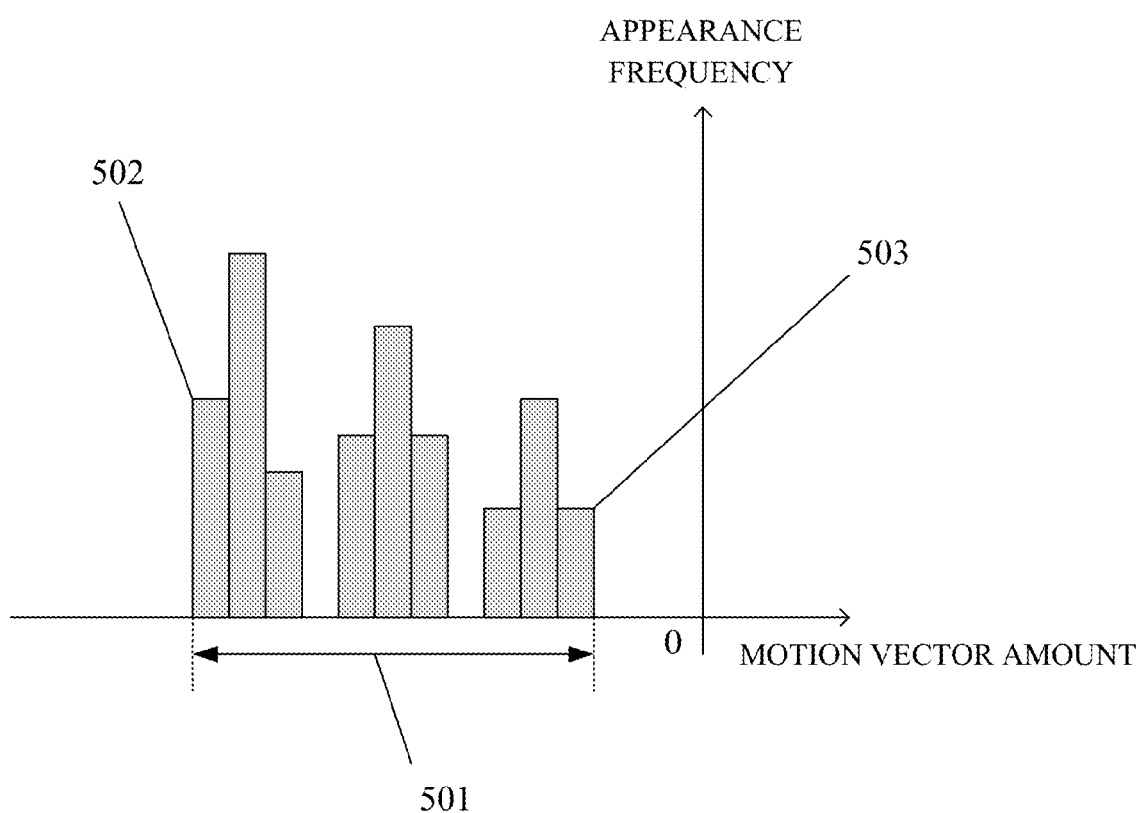
FIG. 5 illustrates the motion vector histogram in Embodiment 1.

FIG. 5 illustrates the histogram indicating the appearance frequencies of the motion vectors in the multiple reference blocks 402 illustrated in FIG. 4B. The camera microcomputer 132 counts a number of motion vectors having same or similar magnitudes (motion vector amounts) to set the number to the appearance frequency of those motion vectors and thus creates the histogram indicating the appearance frequencies of the motion vectors having mutually different magnitudes. In FIG. 5, a horizontal axis denotes the motion vector amount, and a vertical axis denotes the appearance frequencies.

Reference numeral 501 denotes a range of the motion vectors on which their correction by the follow shot assist is performed (in other words, the shift lens unit 104 is shifted so as to reduce the motion vector amount to 0). In the following description, this range is referred to as "a correction target vector range"). The motion vector on which the correction is performed is hereinafter referred to as "a correction target vector". FIG. 5 illustrates a larger motion vector closer to a left end of the histogram.

In general, among motion vector amounts detected from an object moving closer to a fixed camera, a motion vector amount detected from a front portion of the object is larger than that detected from a rear portion thereof. Therefore, this embodiment regards, among the motion vectors in the correction target vector range 501, motion vectors 502 indicated at the left end of FIG. 5 as motion vectors of the front portion of the object. The motion vector of the front portion of the object is hereinafter referred to as "a front motion vector". Furthermore, this embodiment regards, among the motion vectors in the correction target vector range 501, motion vectors 503 indicated at a right end of FIG. 5 as motion vectors of the rear portion of the object. The motion vector of the rear portion of the object is hereinafter referred to as "a rear motion vector".

Next, at S203, the camera microcomputer 132 determines whether or not a user's full-press operation of the release switch in the operating switch 131 has been performed. If the full-press operation has not been performed, the camera microcomputer 132 repeats the processes at S201 and S202. On the other hand, if the full-press operation has been performed, the camera microcomputer 132 proceeds to S204.

At step S204, the camera microcomputer 132 acquires, from the histogram created at S202, the front and rear motion vectors.

Next, at S205, the camera microcomputer 132 sets the rear motion vector as the correction target vector.

Then, at S206, the camera microcomputer 132 performs a follow shot assist image capturing process based on the correction target vector. The follow shot assist image capturing process will be described later.

Next, at S207, the camera microcomputer 132 provides a change amount to the correction target vector such that the amount (magnitude) of the correction target vector becomes closer to that of the front motion vector. Thereby, a new correction target vector is set. The change amount of the correction target vector is calculated by the following expression where N represents a still image capturing number (continuous image capturing number) in a predetermined period of time:

change amount=|front motion vector−rear motion vector|/N.

FIG. 12A to 12C illustrate an example of a result of continuous image capturing while sequentially providing a change amount to a correction target vector. In FIG. 12A, reference numeral 1201 denotes a detected object area, and 1202 a motion vector histogram created from the object area 1201. As illustrated in FIG. 12C, performing image capturing three times in total while providing a change amount 1203 to the correction target vector (that is, to a shift drive amount of the shift lens unit 104) calculated from the histogram after each image capturing provides three captured still images illustrated in FIG. 12B.

In FIG. 12B, areas (corresponding to multiple object areas) each surrounded by a broken line are each captured at a center of each captured still image as if it is still by the follow shot assist process.

Then, at S208, the camera microcomputer 132 determines whether or not the amount of the correction target vector has reached that of the front motion vector (whether or not the captured still image illustrated in the left part in FIG. 12B has been produced). If the amount of the correction target vector has reached that of the front motion vector, the camera microcomputer 132 ends this process. If the amount of the correction target vector has not reached that of the front motion vector, the camera microcomputer 132 returns to S206 to perform the follow shot assist image capturing process based on a new correction target vector set at S207.

As described above, in this embodiment, the camera microcomputer 132 sets, depending on the magnitudes of the multiple motion vectors, an order of drive controls of the shift lens unit 104 with shift drive amounts based respectively on the multiple motion vectors.

Next, description will be made of the follow shot assist image capturing process performed by the camera microcomputer 132 at S206, with referring to FIG. 3. At S301, the camera microcomputer 132 (object angular velocity calculator 153) calculates an object angular velocity on the image plane. Then, the camera microcomputer 132 calculates, by using the object angular velocity and the correction target vector, a shift drive amount of the shift lens unit 104 for a correction to be made such that the correction target vector reduces to 0.

Figure 6:
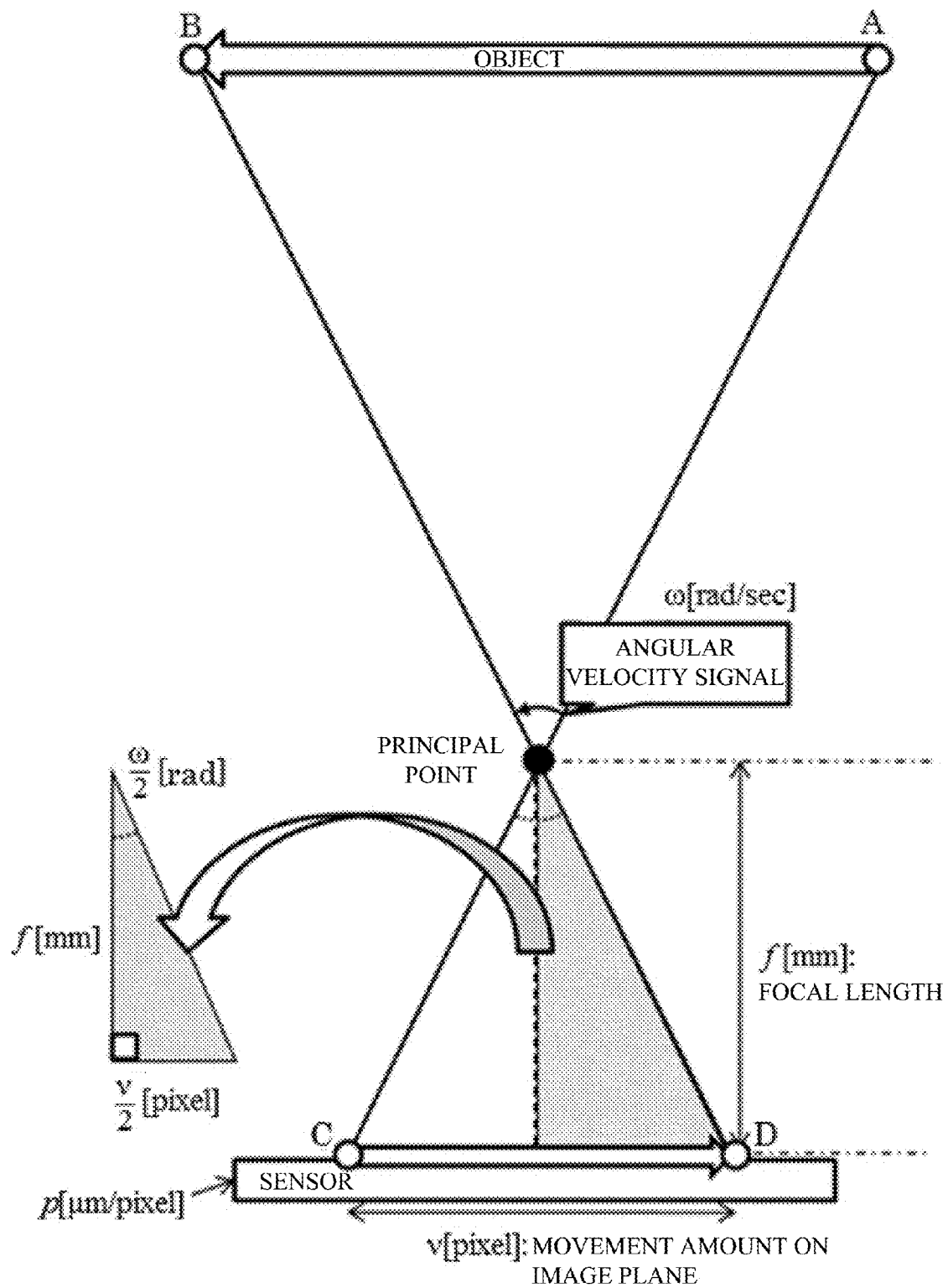
FIG. 6 illustrates a method of calculating an object angular velocity in Embodiment 1.

With referring to FIG. 6, description will be made of a method of calculating the object angular velocity. FIG. 6 illustrates that an actual object moves from a point A to a point B in t seconds and therewith an object image on the image sensor 122 moves from a point C to a point D. When v (pixels) represents a distance from the point C to the point D, f (mm) represents a focal length of the image capturing optical system 101, and p (μm/pixel) represents a pixel pitch of the image sensor 122, an object angular velocity ω (rad/sec) on the image plane is expressed by following expression (1).

$$\tan\frac{\omega}{2}[\text{rad/sec}] = \frac{v}{2}[\text{pixel}] \times \frac{p}{1000}[\text{mm/pixel}] \div t[\text{sec}] \div f[\text{mm}] = \frac{vp}{2000\,tf} \quad (1)$$

-continued
$$\omega = 2\tan^{-1}\left(\frac{vp}{2000\,tf}\right)[\text{rad/sec}]$$

Figure 3:
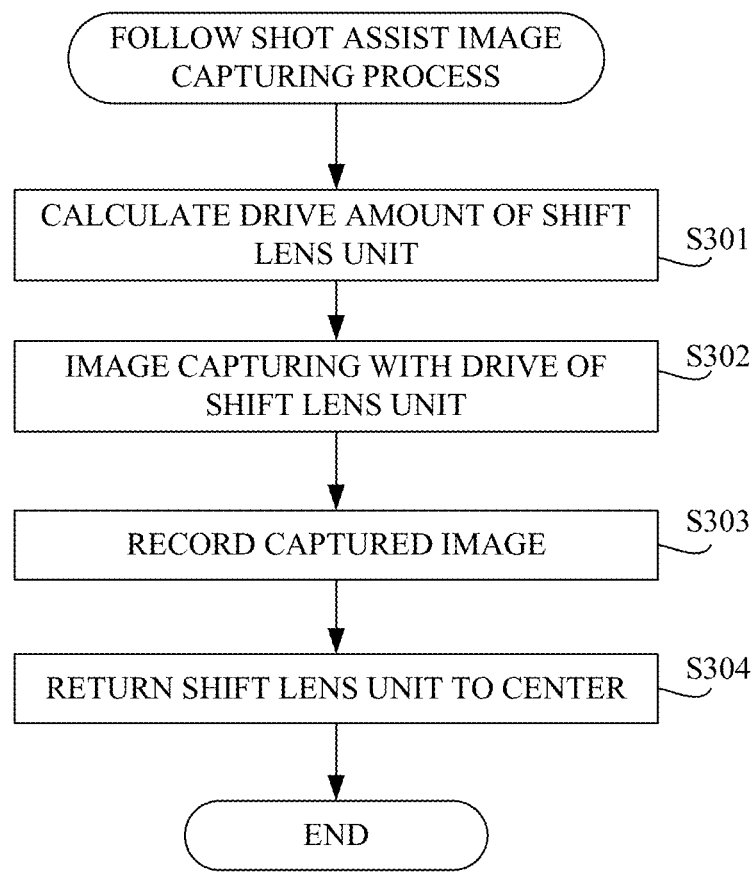
FIG. 3 is a flowchart illustrating a follow shot assist process in Embodiment 1.

At S302 in FIG. 3, the camera microcomputer 132 sends the shift drive amount of the shift lens unit 104 to the lens microcomputer 113 to instruct the lens microcomputer 113 to perform drive of the shift lens unit 104 from its shift center. The lens microcomputer 113 drives, in response to the instruction, the shift lens unit 104 by the received shift drive amount. The camera microcomputer 132 drives the shutter 121, through the shutter driver 133, such that the shutter 121 opens for exposure of the image sensor 122 for a predetermined period of time and then the shutter 121 shuts. Thus, still image capturing with the follow shot assist is performed.

Next, at S303, the camera microcomputer 132 causes the camera signal processor 124 to develop (produce) a captured still image from an image capturing signal produced through the exposure of the image sensor 122 and then to record the captured still image to the recording medium through the recorder 171.

Thereafter, at S304, the camera microcomputer 132 instructs the lens microcomputer 113 to return the shift lens unit 104 to the shift center. In response to the instruction, the lens microcomputer 113 drives the shift lens unit 104 to the shift center. The returning of the shift lens unit 104 to the shift center is performed for next drive thereof.

As described above, in the follow shot assist continuous image capturing process in this embodiment, the camera microcomputer 132 sequentially changes, after each image capturing, the correction target vector as the motion vector for setting the shift drive amount of the shift lens unit 104 (that is, sequentially provides the change amount to the correction target vector). In other words, this embodiment performs still image capturing multiple times while sequentially changing the shift drive amount of the shift lens unit 104 after each image capturing. Thereby, this embodiment can provide multiple captured still images corrected such that objects in multiple object areas (that is, multiple portions from a front portion to a rear portion of one object long in its front and rear direction), where mutually different motion vectors are detected, are respectively located at centers of these images. Thus, this embodiment can provide, as at least one of the multiple captured still images, a captured still image in which a main object that is a user's image capturing target is located at the center of this image.

Although this embodiment described the case where the follow shot assist continuous image capturing of the object moving closer to the camera is performed, the follow shot assist continuous image capturing of an object moving farther away from the camera can be performed.

In this case, in a correction target vector range (corresponding to the range 501 in FIG. 5) in a histogram showing appearance frequencies of motion vectors, a smallest motion vector at its right end corresponds to the front motion vector, and a largest motion vector at its left end corresponds to the rear motion vector.

Although this embodiment described the case where at S205 in FIG. 2 the rear motion vector is first set as the correction target vector, the front motion vector may be first set as the correction target vector. Moreover, the order of the drive controls of the shift lens unit 104 with the drive amounts based respectively on the motion vectors may be set depending on the appearance frequencies of the motion vectors. For example, motion vectors whose appearance frequency is maximum or minimum may be first set as the correction target vector.

Furthermore, a motion vector detected in a focus detection area (AF area) where a focus state of the image capturing optical system 101 is detected may be first set as the correction target vector.

In addition, although this embodiment described the case where at S301 in FIG. 3 the shift drive amount of the shift lens unit 104 is calculated from the object angular velocity on the image plane, which corresponds to the correction target vector, the shift drive amount of the shift lens unit 104 may be calculated from the object angular velocity on the image plane and a change in an angular velocity (panning angular velocity) of the camera during its panning.

Furthermore, although this embodiment described the case where at S210 in FIG. 2 the change amount provided to the correction target vector is calculated from the continuous image capturing number in the predetermined period of time, the change amount may be calculated from the object angular velocity on the image plane, the panning angular velocity or others.

Moreover, although this embodiment described the case where the angular velocity sensor 111 is provided to the interchangeable lens 100, the angular velocity sensor 111 may be provided to the camera body 120.

Embodiment 2

Next, description will be made of a second embodiment (Embodiment 2) of the present invention. Embodiment 1 changes the motion vector for setting the shift drive amount of the shift lens unit 104 after each image capturing in the follow shot assist continuous image capturing, thereby acquiring the captured still images in each of which the main object is located at the center of the image. However, depending on the panning angular velocity of the camera, there may be a case where an object existing in a first captured still image does not exist in a second captured still image.

Such a case will be specifically described with referring to FIGS. 9A, 9B, 10A and 10B.

FIG. 9A illustrates an object moving closer to a fixed camera. As well as described in Embodiment 1, when the object moves closer to the camera, a largest motion vector in a correction target vector range in a motion vector histogram illustrated in FIG. 9B is set as the front motion vector, and a smallest motion vector therein is set as the rear motion vector. With this setting, changing the amount of the correction target vector from that of the front motion vector to that of the rear motion vector enables acquiring multiple captured still images corrected such that multiple portion from a front portion to a rear portion of the object are respectively located at centers of the images.

On the other hand, FIGS. 10A and 10B illustrate relations between a panning angular velocity and continuously captured still images acquired by the follow shot assist continuous image capturing. In these drawings, each captured still image is surrounded by a bold line 1001, and each target object area to be corrected such that this area is located at a center of the captured still image is surrounded by a broken line 1002. The target object area is hereinafter referred to as "a correction target object".

FIG. 10A illustrates a first captured still image and a second captured still image acquired when the amount of the correction vector is sequentially changed from the amount of the front motion vector toward that of the rear motion vector while the object is moving closer to the fixed camera. FIG. 10A illustrates a case where the panning angular velocity of the camera is faster than a moving velocity of the object. In this case, an intermediate portion of the object in its front and rear direction existing in the first captured still image does not exist in the second captured image. That is, the correction target object that should be included is not included in the second captured image.

FIG. 10B illustrates a first captured still image and a second captured still image acquired when the amount of the correction vector is sequentially changed from the amount of the rear motion vector toward that of the front motion vector while the object is moving closer to the fixed camera. FIG. 10B illustrates a case where the panning angular velocity of the camera is slower than the moving velocity of the object. In this case, the front portion of the object existing in the first captured still image does not exist in the second captured image. That is, the correction target object that should be included is not included in the second captured image.

In order to avoid such failed image capturing, this embodiment changes, depending on the panning angular velocity, a direction in which the amount of the correction target vector is changed (that is, changes which one of the amounts of the front and rear motion vectors the amount of the correction target vector is changed from, to the other).

In other words, this embodiment sets, depending on the panning angular velocity, an order of drive controls of the shift lens unit 104 with shift drive amounts based respectively on multiple motion vectors having mutually different magnitudes. This embodiment will also describe the case, for example, where the follow shot assist continuous image capturing of the object moving closer to the fixed camera is performed.

A camera constituted by a camera body and an interchangeable lens in this embodiment has a similar configuration to that of the camera in Embodiment 1, and common constituent elements to those in Embodiment 1 are denoted by the same reference numerals as those in Embodiment 1.

Figure 7:
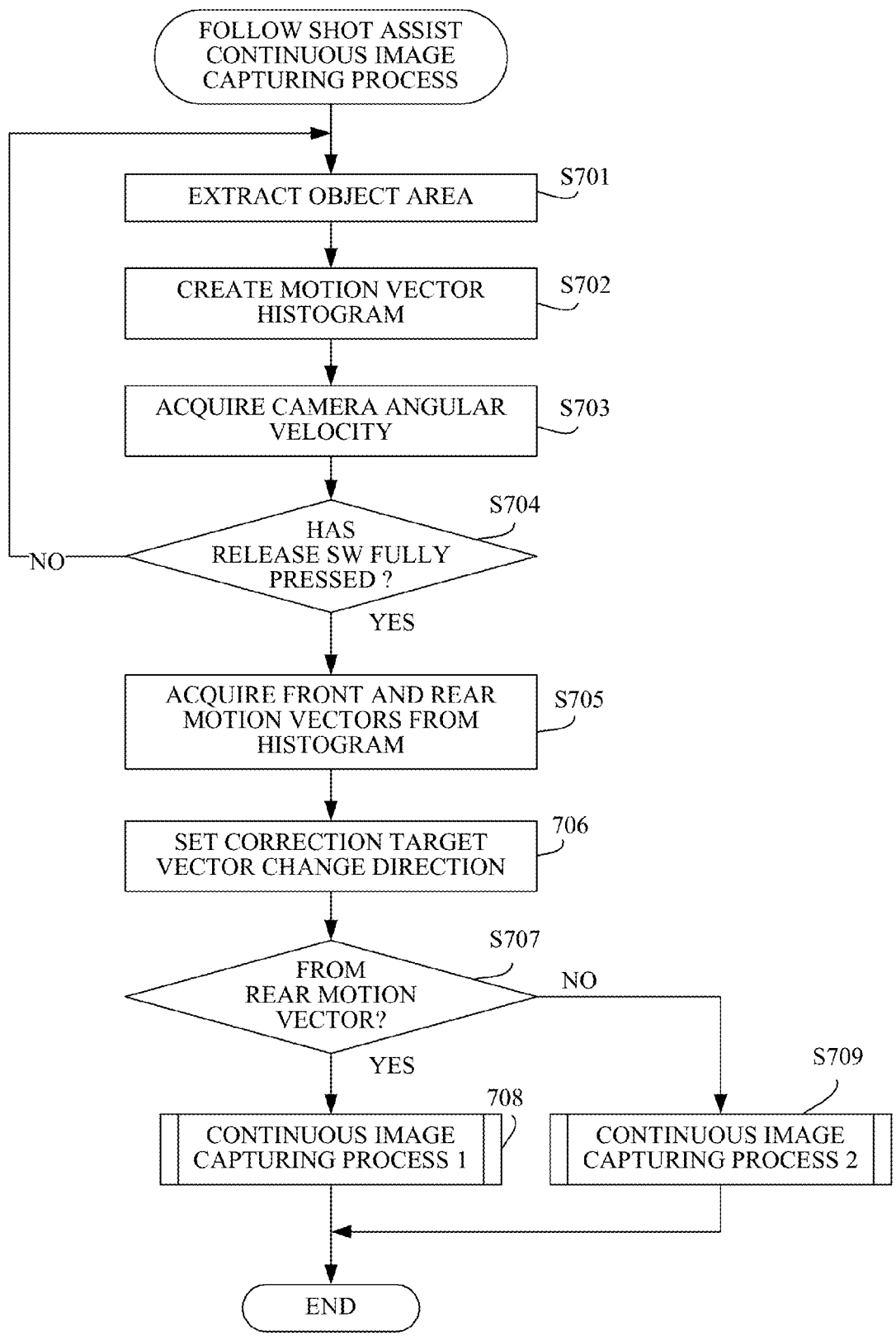
FIG. 7 is a flowchart illustrating a follow shot assist continuous image capturing process in Embodiment 2 of the present invention.

With referring to a flowchart of FIG. 7, description will be made of a follow shot assist continuous image capturing process in this embodiment. A camera microcomputer 132 serving as a motion vector acquisition unit and a control unit performs this process, together with a lens microcomputer 113, according to an image capturing control program as a computer program. In FIG. 7, reference character S represents a step.

Processes at S701 and S702 are the same as those at S201 and S202 in Embodiment 1 (FIG. 2).

At S702 after S702, the camera microcomputer 132 acquires information on a panning angular velocity of the camera detected by an angular velocity sensor 111 through the lens microcomputer 113 and holds the information on the panning angular velocity in a predetermined period of time. The information on the panning angular velocity in the predetermined period of time is used to set the direction in which the amount of the correction target vector is changed at S706 described later.

Processes at S704 and S705 are the same as those at S203 and S204 in Embodiment 1 (FIG. 2).

At S705 after S706, the camera microcomputer 132 sets a correction target vector changing direction as the direction in which the amount of the correction target vector is changed. Description will be made of a method of setting the correction target vector changing direction with referring to FIGS. 11A and 11B.

Figure 11A:
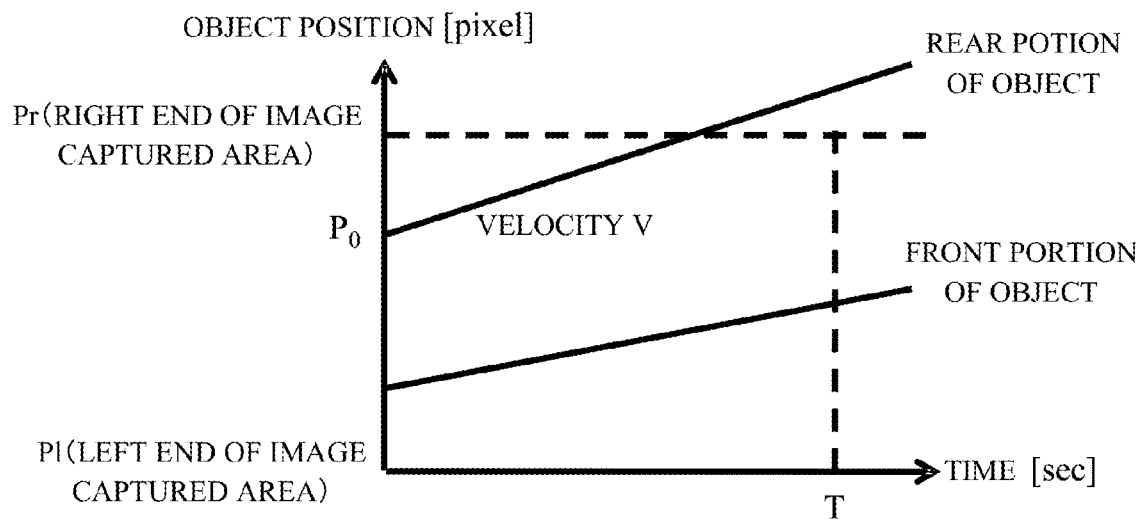
FIGS. 11A and 11B illustrate a method of determining a changing direction of a correction target vector.

FIG. 11A illustrates a relation between time and the correction target object in a case where the panning angular velocity is faster than an angular velocity of a moving object. In FIG. 11A, Pr (pixel) represents a position of a right end of an image captured area, Pl (pixel) represents a position of a left end of the image captured area. A front portion and a rear portion of the object both move closer to the right end of the image captured area with time at a moving velocity V (pixel/sec) on an image plane.

In following expression (2), T (sec) represents a start time of a last still image capturing in the follow shot assist continuous image capturing process, and $P_0$ represents an initial position (pixel) of the rear portion of the object. If T and $P_0$ satisfy a condition expressed by expression (2), in order to ensure still image capturing of a main object as a user's image capturing target, the camera microcomputer 132 sets the rear motion vector as the correction target vector such that the still image capturing of the rear portion of the object as the correction target object is first performed. Then, the camera microcomputer 132 performs continuous image capturing while sequentially changing the amount of the correction vector toward that of the front motion vector. That is, the camera microcomputer 132 sets the correction target vector changing direction to the direction in which (the amount of) the correction target vector is changed from (that of) the rear motion vector toward (that of) the front motion vector.

$$V[\text{pixel/sec}] \times T[\text{sec}] + P_0 > Pr \quad (2)$$

Figure 11B:
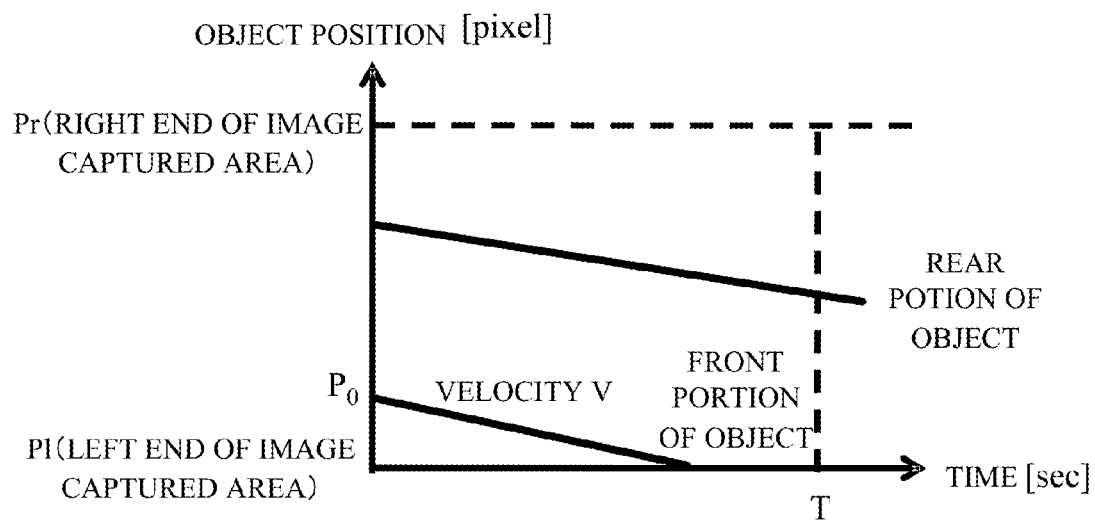

FIG. 11B illustrates a relation between time and the correction target object in a case where the panning angular velocity is slower than the angular velocity of the moving object. The front and rear portions of the object both move closer to the left end of the image captured area with time at the moving velocity V (pixel/sec) on an image plane.

In following expression (3), T (sec) represents the start time of the last still image capturing in the follow shot assist continuous image capturing process, and $P_0$ represents an initial position (pixel) of the front portion of the object. If T and $P_0$ satisfy a condition expressed by expression (3), in order to ensure still image capturing of a main object as a user's image capturing target, the camera microcomputer 132 sets the front motion vector as the correction target vector such that the still image capturing of the front portion of the object as the correction target object is first performed.

Then, the camera microcomputer 132 performs continuous image capturing while sequentially changing the amount of the correction vector toward that of the rear motion vector. That is, the camera microcomputer 132 sets the correction target vector changing direction to the direction in which (the amount of) the correction target vector is changed from (that of) the front motion vector toward (that of) the rear motion vector.

$$V[\text{pixel/sec}] \times T[\text{sec}] + P_0 < Pl \quad (3)$$

At S707, the camera microcomputer 132 determines whether or not the correction target vector changing direction set at S706 is the direction from the rear motion vector toward the front motion vector. If the correction target vector changing direction is the direction from the rear motion vector toward the front motion vector, the camera microcomputer 132 proceeds to S708, and otherwise proceeds to S709.

At S708, the camera microcomputer 132 performs a continuous image capturing process 1 described below. On the other hand, at S709, the camera microcomputer 132 performs a continuous image capturing process 2 described later.

Figures 8A, 8B:
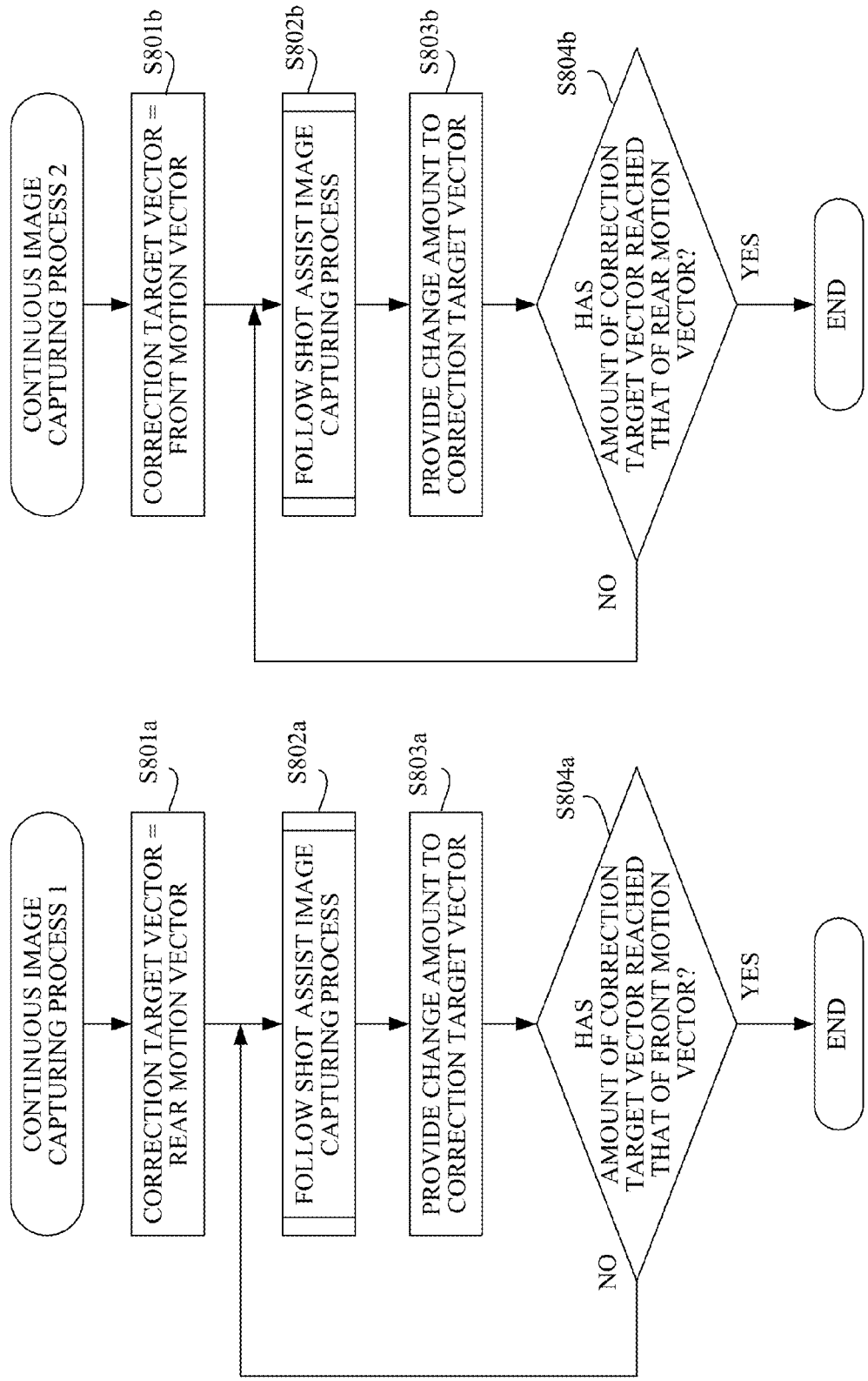
FIGS. 8A and 8B are flowcharts illustrating continuous image capturing processes in Embodiment 2.

Description will be made of the continuous image capturing process 1 performed at S708 with referring to a flowchart of FIG. 8A. At S801*a*, the camera microcomputer 132 sets the rear motion vector as the correction target vector. Then, at S802*a*, the camera microcomputer 132 performs the follow shot assist image capturing process described with referring to the flowchart of FIG. 3. The camera microcomputer 132 further performs at S803*a* and S804*a* the same processes as those at S207 and S208 in FIG. 2. If determining at S804*a* that the amount of the correction target vector has not yet reached that of the front motion vector, the camera microcomputer 132 returns to S802*a*. If determining that the amount of the correction target vector has reached that of the front motion vector, the camera microcomputer 132 ends this process.

Description will be made of the continuous image capturing process 2 performed at S709 with referring to a flowchart of FIG. 8B. At S801*b*, the camera microcomputer 132 sets the front motion vector as the correction target vector. Then, at S802*b*, the camera microcomputer 132 performs the follow shot assist image capturing process described with referring to the flowchart of FIG. 3. The camera microcomputer 132 further provides at S803*b* a change amount to the correction target vector such that an amount of a new correction target vector becomes closer to that of the rear motion vector. The change amount of the correction target vector may be calculated by the method described at S207 in FIG. 2.

The camera microcomputer 132 further determines at S804*b* whether or not the amount of the correction target vector has reached that of the rear motion vector. If determining that the amount of the correction target vector has reached that of the rear motion vector, the camera microcomputer 132 ends this process. If determining that the amount of the correction target vector has not yet reached that of the rear motion vector, the camera microcomputer 132 returns to S802*b*.

As described above, in the follow shot assist continuous image capturing process in this embodiment, the camera microcomputer 132 changes, depending on the panning angular velocity of the camera, the direction in which the amount of the correction target vector is changed and sequentially changes, after each image capturing, the correction target vector for setting the drive amount of the shift lens unit 104. Thereby, regardless of the panning angular velocity, this embodiment can provide multiple captured still images corrected such that objects in multiple object areas (that is, multiple portions from a front portion to a rear portion of one object long in its front and rear direction), where mutually different motion vectors are detected, are respectively located at centers of these images. Thus, this embodiment can provide, as at least one of the multiple captured still images, a captured still image in which a main object that is a user's image capturing target is located at the center of this image.

Although this embodiment also described the case where the follow shot assist continuous image capturing of the object moving closer to the camera is performed, the follow shot assist continuous image capturing of an object moving farther away from the camera can be performed. In this case, in a histogram (correction target vector range) showing appearance frequencies of motion vectors, a smallest motion vector at its right end corresponds to the front motion vector, and a largest motion vector at its left end corresponds to the rear motion vector.

Furthermore, each of Embodiments 1 and 2 described the case of causing the shift lens unit 104 to shift with respect to the optical axis of the image capturing optical system 101 (that is, shift in the direction other than the optical axis direction) to perform the follow shot assist and the image stabilization. However, another configuration may be employed which causes the image sensor 122 as a movable element to shift with respect to the optical axis to perform the follow shot assist and the image stabilization.

Other Embodiments

Embodiments of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-115382, filed on Jun. 8, 2015, which is hereby incorporated by reference herein in its entirety.

What is claimed is:

1. An image capturing control apparatus configured to control an image capturing apparatus that performs still image capturing of a moving object with drive of a movable element movable in a direction other than an optical axis direction of an image capturing optical system, the image capturing control apparatus comprising:
a vector acquisition unit configured to acquire multiple motion vectors respectively detected in multiple object areas of a captured moving image produced by the image capturing apparatus; and
a control unit configured to control the still image capturing with a drive control of the movable element,
wherein the control unit is configured to cause the image capturing apparatus, when the multiple motion vectors have mutually different magnitudes, to perform the still image capturing multiple times with the drive controls of the movable element while changing a drive amount of the movable element on the basis of the respective multiple motion vectors.

2. An image capturing control apparatus according to claim 1, wherein the control unit is configured to set, depending on the magnitudes of the multiple motion vectors, an order of the drive controls of the movable element with the drive amounts based respectively on the multiple motion vectors.

3. An image capturing control apparatus according to claim 1, wherein the control unit is configured to perform the drive controls of the movable element from one thereof with a drive amount based on a largest motion vector or a smallest motion vector among the multiple motion vectors.

4. An image capturing control apparatus according to claim 1, wherein the control unit is configured to set, depending on a motion velocity acquired by detection of a motion of the image capturing apparatus or an interchangeable lens attached to the image capturing apparatus, an order of the drive controls of the movable element with the drive amounts based respectively on the multiple motion vectors.

5. An image capturing control apparatus according to claim 4, wherein the control unit is configured to perform the drive controls of the movable element (a) from one thereof with a drive amount based on a smallest motion vector when the motion velocity is faster than a velocity of the moving object and (b) from one thereof with a drive amount based on a largest motion vector when the motion velocity is slower than the velocity of the moving object.

6. An image capturing control apparatus according to claim 1, wherein the control unit is configured to set, depending on appearance frequencies of the respective multiple motion vectors, an order of the drive controls of the movable element with the drive amounts based respectively on the multiple motion vectors.

7. An image capturing control apparatus according to claim 1, wherein the control unit is configured to perform the drive controls of the movable element from one thereof with a drive amount based on, among the multiple motion vectors, a motion vector detected in an object area included in a focus detection area where a focus state of the image capturing optical system is detected.

8. An image capturing apparatus configured to perform still image capturing of a moving object with drive of a movable element movable in a direction other than an optical axis direction of an image capturing optical system, the movable element being provided with the image capturing apparatus or provided in an interchangeable lens attached to the image capturing apparatus, the image capturing apparatus comprising:
an image capturing system configured to perform image capturing of the object;
a motion vector detection unit configured to detect a motion vector from a captured moving image produced by the image capturing system; and
an image capturing control apparatus,
wherein the image capturing control apparatus comprises:
a vector acquisition unit configured to acquire, from the motion vector detection unit, multiple motion vectors respectively detected in multiple object areas of the captured moving image; and
a control unit configured to control the still image capturing with a drive control of the movable element,
wherein the control unit is configured to cause the image capturing apparatus, when the multiple motion vectors have mutually different magnitudes, to perform the still image capturing multiple times with the drive controls of the movable element while changing a drive amount of the movable element on the basis of the respective multiple motion vectors.

9. A non-transitory computer readable medium storing a program causing a computer to control an image capturing apparatus that performs still image capturing of a moving object with drive of a movable element movable in a direction other than an optical axis direction of an image capturing optical system, the program causing the computer to:

acquire multiple motion vectors respectively detected in multiple object areas of a captured moving image produced by the image capturing apparatus; and perform a control process to control the still image capturing with a drive control of the movable element, wherein the control process causes the image capturing apparatus, when the multiple motion vectors have mutually different magnitudes, to perform the still image capturing multiple times with the drive controls of the movable element while changing a drive amount of the movable element on the basis of the respective multiple motion vectors.

* * * * *